UNITED STATES PATENT OFFICE.

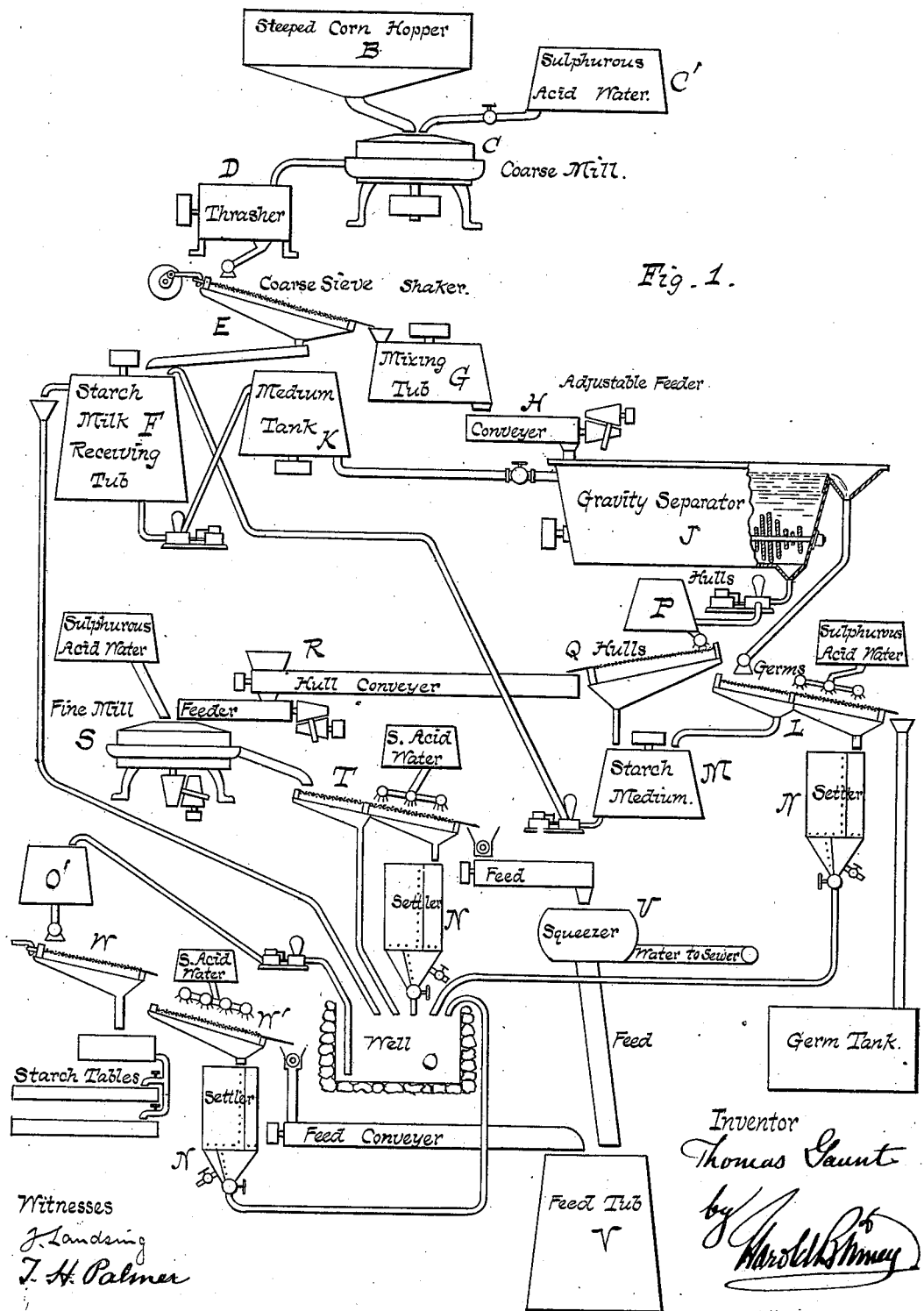

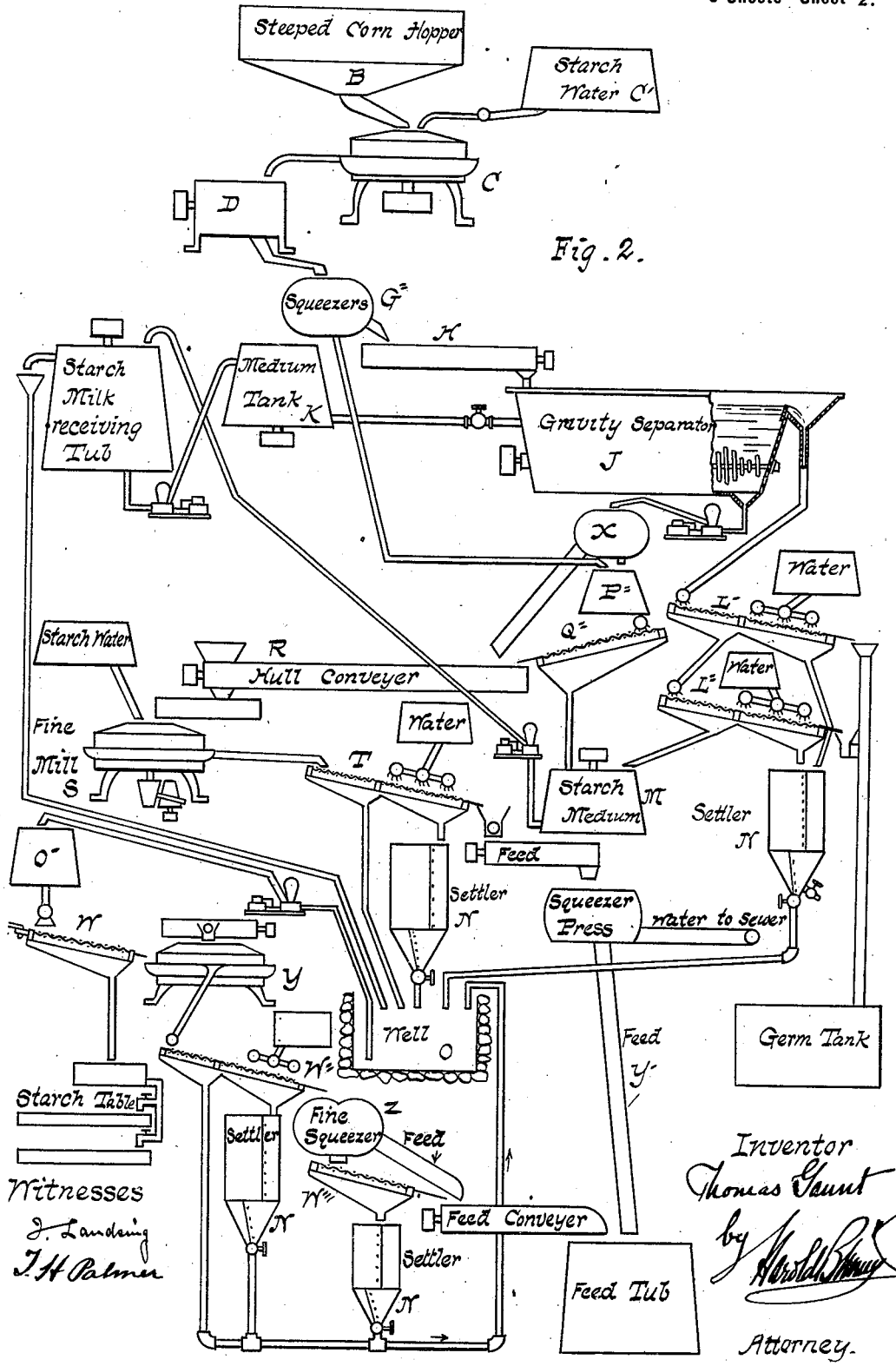

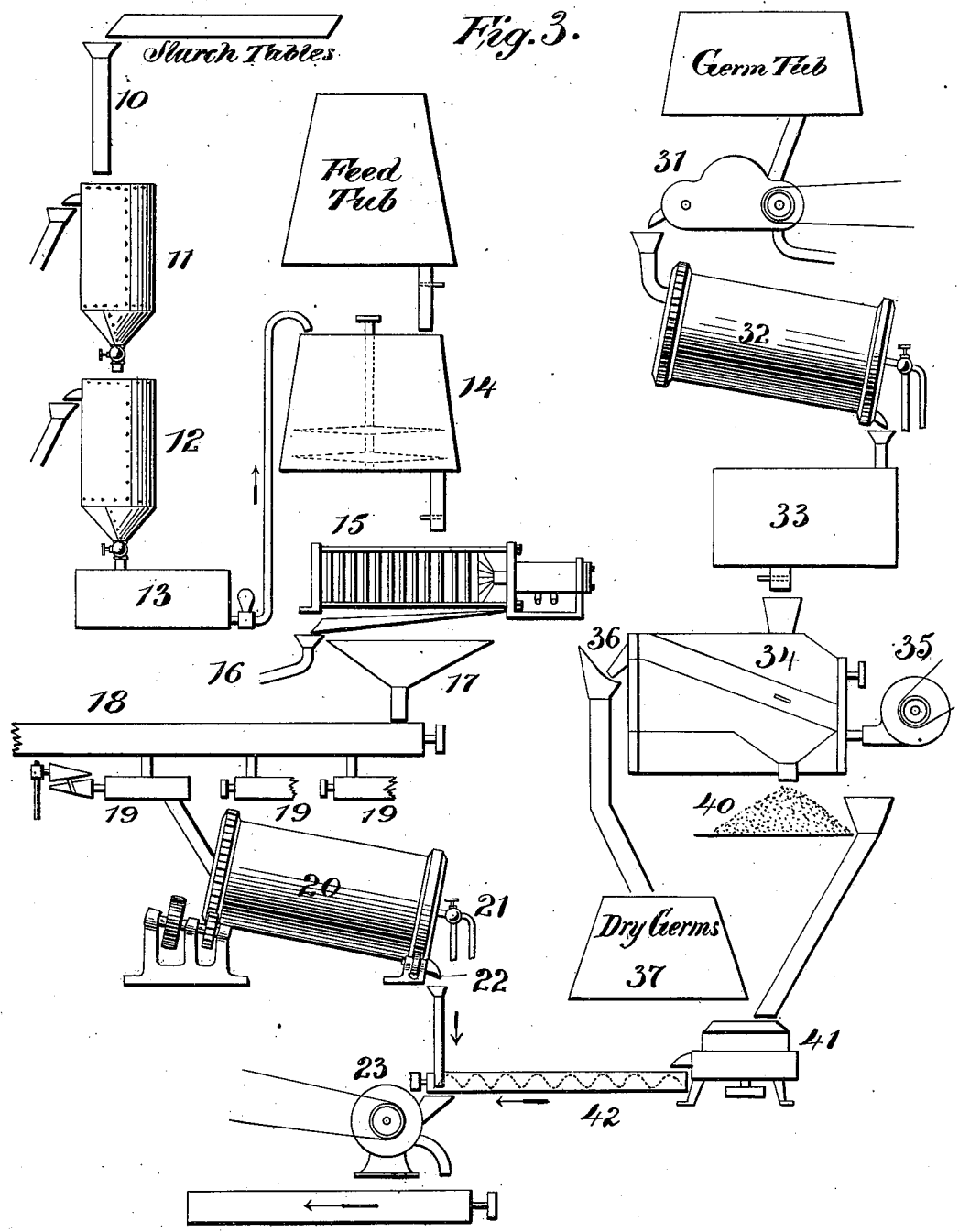

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

PROCESS OF TREATING GRAIN IN MAKING STARCH.

SPECIFICATION forming part of Letters Patent No. 664,258, dated December 18, 1900.

Application filed September 1, 1896. Serial No. 604,509. (No specimens.)

*To all whom it may concern:*

Be it known that I, THOMAS GAUNT, of Peoria, Illinois, (formerly of Buffalo, New York,) have invented certain new and useful Improvements in Treating Corn and Grain in the Manufacture of Starch, Glucose, Feed, and other Products, of which the following is a description, reference being made to the accompanying diagrams, illustrating my process.

This improved process is especially applicable to the manufacture of corn-oil, oil-cake, starch, gluten, feed, and certain other products from Indian corn or maize. Certain of these products are afterward commingled and constitute the feed as put upon the market, while others, such as the starch, go through further processes of refinement and conversion into starch, sugar, glucose, alcohol, or other products. The particular process which forms the subject-matter of this application is the separation and cleansing of the germs, the hulls, and the starch from the gluten and from each other.

Briefly stated, the complete process which forms the subject-matter of the present application consists of several successive steps or subprocesses by which the corn is broken up and divided into starch, gluten, germs, and feed and by which each of these several products is so treated that it is freed from each of the other products, and therefore a maximum yield of each of the products is obtained. Indeed, the waste water from my process is so pure as to be but slightly turbid, and the amount of valuable material held in it is negligible. All the separate steps or subprocesses of my complete process are so mutually dependent and mutually tributary to every one of the final products that the complete process constitutes a unitary process of freeing and separating the several constituents of the corn.

The corn is first steeped, preferably in sulfurous-acid water, until it is swelled and softened. In the steeping a large amount of aromatic and soluble substances are extracted, including a certain amount of sugar and soluble albumens and gluten. These are afterward preferably recovered and added to the feed. The recovery of these products from the steep-water forms the subject of a separate application. The steeped corn is broken in such a manner as to rupture or tear apart the hulls and perisperm without injuring the germs. It is then threshed or beaten in a wet condition to loosen the germs from the adherent substances. After this the mixed germs and husks are freed from the starch-milk and conveyed into a gravity-separator containing a solution of predetermined gravity, preferably starch liquor, of about 8° to 12° Baumé. In this solution the hulls sink to the bottom and the germs rise to the top. The germs are recovered from the surface, the separator medium run off from the germs, and the germs are then washed, so as to free them entirely from starch. They are then ready to be dried, ground, and pressed to form corn-oil and oil-cake or to be otherwise utilized. The coarsely-broken hulls or husks, together with such starch particles and gluten as adhere thereto, are taken from the bottom of the separator, the medium collected from them, and the husks and hulls then ground in fine-grind mills. The germs having been freed from the hulls before this fine grinding, no provision for the protecting of the germs is required, and after being finely ground the hulls are thoroughly washed to free them from all starch and gluten and are then ready to be dried, as hereinafter described, for feed. The starch and gluten liquor as recovered from the germs and hulls as they leave the separator is reused in the separator after being diluted as may be required to preserve the proper density, and it will be seen that the freeing of the hulls and germs from starch-milk before introducing them into the separator enables me to effect the separation in the most direct and quick manner without disturbing the density of the separator medium. The tank in which the medium accumulates overflows into a starch well or reservoir. This starch-milk contains a certain amount of feed, which has passed through the squeezer-mesh or shaker-sieves used in the earlier steps of the process, and I further treat this starch-milk so as to recover all this feed, and thereby increase the yield of feed and at the same time by washing the starch and gluten improve the quality of the starch. I accomplish this by running the starch-milk over fine shaker-sieves and letting the starch-milk which passes through these sieves go to the starch-table and there settle; but the tailings from these fine sieves is found to still contain some starch, so that in turn I recover the starch from this feed by washing it and in some instances by finally grinding it again before washing. Thus it will be seen that the coarsely-broken corn is first freed from the heavy starch-milk which it contains and then separated into hulls and germs. The germs are washed to recover the starch and any fine feed before being dried, as hereinafter described. The hulls after being finely ground are similarly washed, so as to increase the yield of starch and free the hulls from starch, and finally the starch-milk obtained from these various steps is separated into pure starch-milk and fine hulls and the hulls ground and in turn washed free from the starch. Thus the starch-milk from the earlier steps of the processes is further separated from the fine hulls on a fine screen and a further yield of starch then obtained by grinding and washing the fine hulls so obtained. At the same time, therefore, additional feed and additional starch are obtained. The gluten and starch remain together until reaching the starch-tables, and when I speak of "starch-milk" I mean to include heavy starch and gluten water or milk. The starch is separated from the gluten on the starch-tables.

Such is a brief outline of the principal steps of the complete process; but it will be seen that my improvement relates rather to certain details and subprocesses contributing to the efficiency and economy of the process than to the general process pursued, and I have given this preliminary outline of the process in order that the purpose and import of all such details may be more clearly understood in their relation to the general process, as they are separately and successively described hereinafter.

In the accompanying drawings, Figure 1 is a diagrammatic illustration of certain successive steps of my method in one form, the steps being indicated in general order and arrangement, so as to show the various treatments which the corn and the different products receive. Fig. 2 is a similar diagrammatic illustration of a preferred modification, and Fig. 3 illustrates diagrammatically the drying of the feed and germs.

Throughout the drawings like letters of reference indicate like parts.

It must not be understood that these diagrams are intended to in any way illustrate the details of the several apparatus employed. Indeed, many details essential in practice are entirely omitted in these drawings. Among these are pumps, chutes, intermediate tanks, Archimedean-screw conveyers, and other appliances for transferring the different products from place to place and for mixing them or keeping them sufficiently agitated, so as to preserve proper consistency throughout and prevent settling.

The treatment which the steeped corn receives in the first mills is, I believe, peculiarly my own. I use grindstones or bur-mills so set that the stones revolve some distance apart and only serve to break open, roll, and tear apart the hulls and perisperm without grinding or in any way injuring the germs. The stones are so dressed and set that the upper one moves over the lower one at such a distance as to crush and grind the whole grains; but the fragments are rubbed between the relatively-moving surfaces, causing them to roll along and disintegrate and so separate to a large extent the germs. This action is quite different from that between two suitably-separated rollers in which the kernels are merely subjected to pressure between the rolls, and thereby burst open. After steeping the grain the germs are of such toughness that they are not readily injured unless crushed or ground between hard bodies, and the stones of the mill are set so far apart that they cannot grind or directly crush the germs. I may add sufficient sulfurous-acid water or sufficient starch-water in the eyes of the mills to give the grain the proper consistency. From the mill I preferably convey the broken grain through successive mixing devices and wet threshers. I prefer to use a thresher of my own design especially adapted for this purpose, which forms the subject-matter of a separate application.

By the wet-threshing process the germs are beaten about, constantly impinging upon the fixed and movable blades of the threshers until all the adhering starch, gluten, and hulls are loosened from the germs. To further increase the loosening action, I may pump the ground corn as it comes from the threshers through a centrifugal pump into successive sets of mixers and threshers, and so on. In the diagrams the steeped-corn hopper is shown at B, and the first mills in which the corn is broken or high-ground are shown at C. The starch-water or sulfurous-acid water is supplied to the mill from the tank C'. One thresher is indicated at D.

As shown in Fig. 1, the corn after threshing runs over a comparatively coarse shaker-sieve E, which allows the starch-milk to run off to a starch-milk-receiving tub F. The broken hulls, with the germs, fall from the shaker-sieves and are transferred through the mixing-tubs G and suitable conveyers H to the separators J. The separator medium is supplied from a medium-tank K, which in turn is supplied from the starch-milk-receiving tub F. The medium is kept to the proper density by diluting it from time to time, as may be required, with the thinner starch-milk or starch-water which is produced where the germs and hulls are washed with water to free them from all traces of starch. In the gravity-separator J the hulls settle to the bottom and the germs rise. Some slight circulating action should be provided in the separator. I prefer to use a separator which forms the subject-matter of another application filed by me September 1, 1896, Serial No. 604,510. The germs are collected from the surface or near the surface of the separator and are run into coarse or medium shaker-sieves, as at L. The starch medium which runs through the first sections of the shaker-sieves is collected in the tank M and sent back to the starch-receiving tank F. On the lower portions of the shaker-sieves L, or on separate sieves, if desired, the germs are washed with sulfurous-acid water or other water to free them as much as possible from all starch and gluten. The wash-water running through the sieve is settled in one or more settlers N and run into the main starch-receiver, which may be a well O. The germs falling from these shaker-sieves L are practically free from starch and gluten. A certain amount of light husk is still mixed with them, however, and this is recovered by means of an aspirator, which will be further set forth in connection with Fig. 3, the husks so recovered being ground and added to the feed.

It will now be seen that the germs have first been steeped and swelled, then loosened from the husks, then separated in a gravity-separator, then washed, and then dried and treated in an aspirator to free them from the husks. Thus while contributing to the purity of the germs an increased yield of starch and of feed is obtained, for it will be seen that the feed and the starch as recovered from the germs are preserved and each obtained in a substantially pure state.

The broken hulls, with adherent starch and gluten, are drawn from the bottom of the separator-tanks, run to a collecting-tank P, and then run onto the shaker-sieves Q, by which the starch medium is recovered and run to the tank M, from which it is sent back to the starch-milk-receiving tub F. The broken hulls, with adherent matter, are conveyed from the shakers Q to fine-grind mills S, where they are finely ground, with the addition of sulfurous-acid or starch water or water, as desired, and then run onto medium or coarse shaker-sieves T.

For convenience of distinction I will refer hereinafter to the heavy starch-milk in all instances as "milk" or "starch-milk," and the diluted starch liquid obtained from washing the hulls, feed, and germs I will refer to as "starch-water," while the liquor of fixed density used in the separator I will refer to as my "medium," using the term "medium" only in this sense.

The starch-water obtained from the shaker-sieves T may conveniently be run to the well O, and the starch-water obtained by washing the finely-ground hulls and germs on the lower portion of the sieves T or on other sieves may be run through settlers N and then to the well O, while the hulls after being so washed may be run through presses or squeezers U and then to the feed-tub V. It will be seen that the water from the squeezer U will be almost entirely free from any valuable substance, and it is therefore run directly to the sewer, as shown in the diagram. It will now be seen that the feed has been entirely freed from starch and gluten and separately collected, that the germs have been freed from starch and gluten and separately collected, and that all the starch obtained is accumulated in the well O, for, as already explained, the overflow from the starch-milk-receiving tub F runs to this well O; but while it is true that the feed and the germs have been practically freed from the starch it is not true that the starch from well O is free from feed. To recover this feed, and thereby improve the starch and at the same time increase the yield of feed, the starch-milk from the well O is run through the tank O' onto the fine shaker-sieve W. The starch-milk which passes through that shaker-sieve is free from feed and may be run into a suitable supply-tank for the starch-tables, as indicated. The tailings from these fine shaker-sieves W may then be washed on other fine shaker-sieves W' and thence conveyed directly to the feed-tub V. The starch-water obtained from the shaker-sieve W' may settle in the settlers N and run back into the starch-well O. Thus it will be seen that all the starch-milk from the well O is run over the screen W of very fine mesh, that the solid materials or feed do not pass through this shaker W, but are washed on the succeeding sieve W' before being sent to the feed-tub, and that the wash-water or starch-water so obtained goes back into the well O. Thus the coarser feed directly taken from the corn and starch-milk consists of such feed as after being ground in fine mill S and thoroughly washed on medium or coarse shakers T and squeezed in fine-meshed squeezers U reaches the feed-tub V without having passed through the shaker-sieve T. The finest feed, which passes through the sieve T and goes to the well O with the starch-milk instead of being wasted, as common heretofore, is recovered and the starch at the same time purified by first freeing the starch from all feed on the fine shaker-sieves W and then in turn freeing the fine feed from all starch on the shaker-sieves W', and thereby increasing the yield of both starch and feed.

The foregoing process is not my preferred process; but from it the additional features which characterize my most approved process will be more readily apparent.

In Fig. 2 the process as at present preferred by me is diagrammatically indicated. Without repeating the points in the process, which are substantially the same as in Fig. 1, I will restrict the following descriptions almost entirely to the differences between the two. The first of these differences is the substitution of squeezers or pressers G'' for the coarse-sieve shaker E. I have found that by the use of squeezers at this point, in combination with certain other features introduced at other points and coöperating with it, I can accomplish as fine results as with the use of coarse-sieve shakers and at the same time considerably increase the volume of material which may be handled with a given amount of machinery. The squeezers G'' free the germs and broken corn from most of the liquor more effectively than shaker-sieves alone can do, and although some of the feed passes through the meshes of the squeezers it is completely recovered afterward, as will be seen. The squeezers G'' and threshers D both assist in disintegrating the corn, and these two elements D and G'' may be arranged so that the thresher acts on the corn either before or after it has been run through the squeezer G'', though I prefer the order shown in Fig. 2. The starch liquor and such feed as it contains may be led through the tank P'' or into shaker-sieves Q''. The liquor which runs through these sieves constitutes the main supply of my starch medium. It will be seen that these sieves Q'' have only to deal with the liquor from the squeezers G'' and X, the hulls and germs being taken care of without going onto any shakers that correspond with shakers E of Fig. 1. The broken hulls and germs after being squeezed are conveyed into the separator J, as before. The separator medium is supplied from medium-tank K, which in turn receives its supply from starch-milk-receiving tub F, as before. The germs from the separator J instead of being treated on the sieve L go first onto shaker-sieves L', where they are washed with water, sulfurous-acid water, or otherwise before going to the germ-tank; but I use coarse sieves of copper L' in the approved process and recover such broken germs as may pass through them by running the heavy liquor from the first sections of the shaker L' onto finer shakers L''. The washing is repeated on the shaker L''. The washed germs from sieves L'' are also carried to the germ-tank. The heavy liquor from the sieves L'', which, it will be seen, has been freed from fine particles of germs, is run into the starch-medium tank M, as in Fig. 1. The wash-water or starch-water from both shaker-sieves L' and L'' is run through the settlers into the well O. The hulls as they are drawn out of the bottom of the separator J are also treated in a manner which is a distinct improvement over that of Fig. 1. They are first run through squeezers X, and thereby most of the medium recovered, the coarse hulls being conveyed from the squeezers X to the fine-grind mills S. The liquor from the squeezers X, with such hulls as squeeze through, is run through sieves Q'' in the same manner as the liquor from the squeezers G'' and thence into the tank M, from whence it is carried to the starch-tub F, as in Fig. 1. The hulls recovered by the sieves Q'' go to the fine mills S.

In Fig. 2 the starch-milk from the well O may be pumped to a tank O', as before, and run onto the very fine meshed sieve W. The starch-milk which runs through this sieve may go directly to the starch-tables, as in Fig. 1; but the tailings from the sieve W are reground very finely in the mill or mills Y, so as to make them as fine as possible and also thereby recover a further amount of starch. From these mills Y the feed is run onto shaker-sieves W'' of medium fineness and there washed. Thence the feed passes to fine-meshed squeezers Z and from there through a suitable conveyer or otherwise to the feed-tub V. The thin liquor which runs from these squeezers Z is run onto the very fine shaker-sieves W'''' and an additional amount of feed thereby recovered, while the starch-water which runs through is settled and sent back to the well O. The starch-milk from the shaker-sieves W'' and the starch-water after it has settled are both sent back to the well O.

By the use of the third mills Y several distinct results are accomplished, as follows: The sieves T may be of somewhat coarser mesh than in Fig. 1 without harm. Fine mills S are no longer solely relied upon for the finest reduction of the feed and the consequent loosening of the gluten and starch particles. The mills S can treat a greater quantity of corn, and therefore need not be of so great size, number, or capacity. The finest hulls or feed obtained by the mills Y produces an additional yield of starch and is therefore rendered more free from starch. By the use of the fine squeezer Z and the fine shaker-sieve W'''' a much greater capacity is obtained than by the use solely of a fine sieve at W'' in Fig. 1 and the feed is drier.

Turning now to diagram Fig. 3, it will be seen that from the portions of the process shown in Figs. 1 and 2 are derived wet starch and gluten-water at the starch-tables, moist feed at the feed-tub V, and wet germs at the germ-tub. The further treatment of the starch will depend upon the uses to which it is to be put, so that for the purposes of my invention the wet starch is one of the products of my present process.

The treatment of gluten, germs, and hulls to produce the finished feed and the dry germs ready for the grinding and oil processes is as follows: The gluten-milk which runs from the starch-settling tables may be conducted by piping 10 or otherwise through successive settling-tanks 11 and 12 and after concentration by settling collected in a suitable receptacle 13. This gluten may be made a separate product for various uses as a valuable food product, or it may be run into and mixed with the moist feed from tub V, preferably in a mixing vat or tub 14. The feed is then pressed in a hydraulic or other press 15. The water escapes from the press and is carried off to the sewer through waste-pipe 16. The well-squeezed feed may then be carried by hopper 17 and conveyer 18 or as desired to the drying apparatus. Preferably the driers each consist of a large steam-heated rotating drum 20, heated by suitable connections 21. Several of these driers may be supplied from conveyer 18 by means of separately driven and controlled feeders 19, driven by Evans cones or other suitable connections. In the driers the feed is subjected to dry heat and is gradually fed by gravity through the driers and delivered at the end 22 to be run through mills 23 or otherwise finely broken up. The germs from the germ-tub which have already been washed and partially freed from water on the sieves L or L″, Figs. 1 and 2, are further dried, first, by pressure in the squeezer-presses 31 and then by dry heat in driers 32, preferably similar to driers 20. The thoroughly-dry germs, which may be received in tub 33, are found to have fine portions of the husks intermingled with them. These I recover by air-blast, preferably in an aspirator 34, which may be supplied by blower 35 or otherwise. The dry husks 40 are finely ground in mill 41 and carried by conveyer 42 or other means to be mixed with the other feed. The dry germs may pass through chute 36 to a suitable storage-receptacle 37 ready for such use as may be desired.

As will be apparent to any one skilled in this art, the foregoing process is particularly applicable for treating great quantities of material. For small plants some of the features may be omitted, but not without some loss being occasioned by the omission. In the gravity-separator the broken corn and germs may be admitted with all or nearly all the liquor which they contain and the density of the starch medium in the separator controlled by suitably proportioning the amount supplied from the medium-tank K and the amount of the water that is added to the corn in the mills C; but such a procedure presents marked disadvantages over the arrangement which I have described as being preferable.

Among the advantages of my preferred method may be mentioned the fact that the flow of the medium into and out of the separator J may be increased or decreased and the flow thereby controlled quite independently of the amount of corn supplied, for the same medium may be used over and over again, if desired, and after the cycle is once established nearly the same amount of starch-milk will overflow from the receiving-tub F into the well O as is produced in a given time by the squeezers G″. By increasing or decreasing the amount of starch-water supplied to the mill C the density of the starch medium can be regulated to a nicety, or I may, as I stated, dilute the starch-milk in the tank F as required by the direct addition of starch-water thereto.

Having now described at length the several related subprocesses and having explained their relation to each other, I claim, without meaning to limit myself in any sense to any details of the apparatus suggested by the drawings, the following:

1. The improved process of treating corn and grain, substantially as set forth: by breaking and disintegrating without grinding the germs of the steeped or soaked corn, with water, separating the starch liquor from the broken hulls and germs; immersing the hulls and germs in a separating medium consisting of starch liquor; drawing off the germs from above and the hulls from below; thereafter recovering and rinsing the said medium from the said germs and the said hulls; controlling the supply and density of the said medium at will by supplying it at the required density and drawing it off continuously independently of the amount of germs and hulls supplied; and thereafter reducing the said hulls, and suitably separating the starch, and hulls, substantially as set forth.

2. The improved process of treating corn and grain, substantially as set forth: by breaking and disintegrating without grinding the germs of the corn with water; separating the hulls and germs from the starch liquor; then immersing the hulls and germs in a separating medium consisting of starch liquor; supplying the said separating medium at the required density and drawing it off continuously independently of the amount of germs and hulls supplied; drawing off the germs from above and the hulls from below; and thereafter recovering the said medium from the said germs and the said hulls, whereby the flow and density of the said medium may be independent of the amount of germs and hulls, substantially as set forth.

3. The improved process of treating corn and grain substantially as set forth, by grinding the corn with water, between suitably-separated surfaces, without grinding the germs; pressing and separating the hulls and germs from the starch liquor; then immersing the moist hulls and germs in a separating medium of starch liquor; collecting the germs from above and the hulls from below; thereafter recovering the said medium from the said germs and hulls, returning some of the starch liquor as separating medium in an endless cycle, the separating medium being supplied at the required density and drawn off continuously independently of the amount of hulls and germs treated.

4. In the process for treating corn for the manufacture of starch, glucose, and other products, the method of increasing the yield by washing the ground corn or hulls upon screens or shakers, with an admixture of sulfurous acid, whereby the starch and gluten may be more readily separated from the hulls and perisperm, substantially as set forth.

5. In the process of treating corn for the manufacture of starch, glucose, and other products, the method of increasing the yield by facilitating and increasing the settling and separation of the starch and the gluten upon the starch-tables by the presence of sulfurous acid, substantially as set forth.

6. The improvement in the process of treating corn, substantially as set forth, for the separation of germs: which consists in separating the ground hulls and germs from the starch liquor prior to immersion; then immersing them in a starch liquor or medium of suitable density, floating and separating the said germs; supplying the separating starch liquor or medium at the required density and drawing it off continuously independently of the amount of germs and hulls supplied thereto, and thereafter recovering the said medium from the said germs, and washing the said germs, substantially as set forth.

7. The improvement in the process of treating corn for the separation of germs, which consists in suitably disintegrating the hulls and germs with water, then subjecting the commingled hulls and germs to pressure and expressing the free starch liquor, and then immersing them in a starch liquor or medium of suitable density and floating or collecting the said germs, and thereafter washing the said germs, and drying them, substantially as set forth.

8. The improvement in the process of treating corn, substantially as set forth, for the separation of germs, which consists of breaking or grinding the corn in water, pressing and disintegrating the hulls and germs, separating the germs from the hulls by the action of starch liquor, washing the germs, and then drying them.

9. The improvement in the process of treating corn, substantially as set forth, for the separation of germs, which consists of breaking or grinding the corn in water, pressing and disintegrating the hulls and germs, separating the germs from the hulls by the action of starch liquor, washing the germs and subjecting them successively to a drying action, and an air-blast.

10. The improvement in the process of treating corn, substantially as set forth, for the separation of germs, which consists in breaking or grinding the corn in water, pressing and disintegrating the hulls and germs, separating the germs from the hulls by the action of starch liquor, washing the germs, and then drying them and subjecting them to an air-blast, and separately collecting the dry germs and the light husks from the air-blast.

11. The improvement in the process of separating the germs from hulls and starch liquor, substantially as set forth: which consists in separately introducing the commingled hulls and germs into the separator-tank in desired quantities; supplying at the required density a determinate quantity of suitable medium independently of the amount of hulls and germs; drawing off a quantity of the medium with the hulls and with the germs; and controlling the circulation, density, and flow, of the medium at will, substantially as set forth.

12. The improvement in the process of separating the germs from hulls and starch liquor, which consists in disintegrating and then introducing commingled hulls and germs into separator-tank in desired quantities; supplying at the required density a suitable medium independently of the amount of hulls and germs, measuring and drawing off by meter-pump, or otherwise, at a definite rate a portion of the said medium containing the said hulls, collecting the germs with the remainder of the said medium and recovering and restoring a portion of the said medium to the said tank in a continuous cycle, substantially as set forth.

13. The improvement in the process of separating germs from hulls and starch liquor, substantially as set forth: which consists in immersing the ground or otherwise-prepared hulls and germs in a separating medium of predetermined density; and in supplying and drawing off the said medium in a continuous cycle independently of the amount of hulls and germs supplied, whereby the desired density and circulation may be preserved and the said germs be collected from the surface of the said separating medium, substantially as set forth.

14. The improvement in the process of treating corn, which consists in suitably separating the germs from the perisperm, then washing the germs, then subjecting them to heat, then to an air-blast and thereby recovering the quantity of light husks from the said germs, and thereafter regrinding the said husks, substantially as set forth.

15. The improvement in the process of treating corn, which consists in simultaneously increasing the purity and yield of germs, starch and feed, by separating the germs from the husks in a suitable medium; thereafter washing the said germs and preserving the liquor obtained; thereafter drying the germs and recovering an additional yield of husks by dry separation; separating the husks or feed from the starch liquor by screening and washing, after suitable grinding; and then screening the starch liquor; and thereafter obtaining all the remaining feed from the starch liquor, by means of suitable sieves, and in turn, recovering all starch remaining in such feed by washing; whereby the germs, the feed, and the starch, are obtained substantially free from each other, and in an increased amount of each, substantially as set forth.

In testimony whereof I have hereunto set my hand at New York, N. Y.

THOMAS GAUNT.

Witnesses:
GEORGE H. SONNEBORN,
HAROLD BINNEY.